United States Patent [19]

Schou

[11] 4,400,996
[45] Aug. 30, 1983

[54] POSITIVE CLUTCH DIFFERENTIAL

[76] Inventor: Carl E. Schou, 1438 Lone Pine Rd., Bloomfield Hills, Mich. 48013

[21] Appl. No.: 306,833

[22] Filed: Sep. 29, 1981

Related U.S. Application Data

[63] Continuation of Ser. No. 127,219, Mar. 4, 1980, abandoned.

[51] Int. Cl.³ ............................................. F16H 35/04
[52] U.S. Cl. .................................... 74/650; 74/710.5; 74/711
[58] Field of Search ...................... 74/710.5, 711, 713, 74/650

[56] References Cited

U.S. PATENT DOCUMENTS

| | | | |
|---|---|---|---|
| 1,238,659 | 8/1917 | Ford | 74/650 |
| 1,242,587 | 10/1917 | Patch | 74/650 |
| 1,254,540 | 1/1918 | Ruden | 74/650 |
| 1,275,952 | 8/1918 | Luxmore | 74/650 |
| 1,328,440 | 1/1920 | Lewis | 74/650 |
| 1,477,311 | 12/1923 | Cartwright | 74/650 |
| 2,060,558 | 11/1936 | De Lavaud | 74/650 |
| 2,175,520 | 10/1939 | Frederickson | 74/650 |
| 2,179,923 | 11/1933 | De Lavaud | 74/650 |
| 3,397,593 | 8/1968 | Knoblock | 74/650 |
| 3,791,238 | 2/1974 | Bokovog | 74/650 |

FOREIGN PATENT DOCUMENTS

| | | | |
|---|---|---|---|
| 635368 | 8/1934 | Fed. Rep. of Germany | 74/650 |
| 50375 | 4/1940 | France | 74/650 |

Primary Examiner—Leslie A. Braun
Assistant Examiner—Lawrence J. Gotts
Attorney, Agent, or Firm—Cullen, Sloman, Cantor, Grauer, Scott and Rutherford

[57] ABSTRACT

A differential assembly of the automotive vehicle type, for rotating axially aligned drive axles, having a rotatable driving casing which distributes the power to the inner end portions of the axles. A center ring member, having opposite wedge-like, face tooth formations, is secured within the casing for meshing with and driving corresponding tooth formations on a pair of pressure rings between which the center ring member is positioned. Each pressure ring is connected to one of the axles through a clutch. The pressure rings are movable towards and away from the center ring for respectively disengaging and engaging their clutches. A splined stop ring meshes with corresponding internal splines formed on each of the pressure rings for limiting each pressure ring's rotational movement relative to the center ring for holding the meshed center ring teeth and the teeth of either pressure ring apart when that pressure ring's rotational speed exceeds the rotational speed of the center ring and casing. During such speed conditions, the respective pressure ring can move towards the center ring so as to disengage its clutch and permit its axle to free wheel while the opposite axle is still driven by the rotating casing.

4 Claims, 8 Drawing Figures

POSITIVE CLUTCH DIFFERENTIAL

This is a continuation of application Ser. No. 127,219, filed Mar. 4, 1980, now abandoned.

BACKGROUND OF INVENTION

The most commonly used automotive vehicle differential is of the bevel gear configuration. This differential is coupled to the vehicle engine drive shaft and divides the engine's output and torque equally to both drive wheel axles. This differential permits the speeds of the driven shafts to change according to demand.

The conventional differential does not permit any larger amount of torque to be transmitted to the ground that twice the amount that may be transmitted to the wheel with the lesser traction. Consequently, when the traction of either wheel is zero, such as when the wheel is spinning on ice, there is no power or torque transmitted to the ground by either of the wheels or driven axles. As is well known, when one wheel spins, the opposite wheel does not rotate at all with this conventional differential.

Consequently, various types of power-dividing or limited slip differentials have been developed for the purpose of powering one wheel when the opposite wheel spins, i.e., has lost traction. By way of example only, one form of such a power-dividing differential is disclosed in my prior U.S. Pat. No. 2,720,796 issued Jan. 18, 1955.

However, available limited slip power-dividing differentials are relatively expensive and complex in construction and tend to wear out sooner than the above conventional differential. Moreover, they typically do not perform satisfactorily at low ground friction when the vehicle goes around a curve where the outer wheel must rotate faster than the inner wheel, in which cases, there is a tendency to lose control due to lock up of wheels causing scuffing of the tires. Further, problems tend to arise when a wheel momentarily leaves the ground while the other remains in contact with the ground. Further, when one wheel looses traction, there is still a tendency for it to spin to some extent. Consequently, there has been a need for an improved differential capable of instantaneously transmitting torque to the wheel having traction while the other wheel looses its traction and also to handle the problem of one wheel rotating faster than the other, without further complicating or increasing the cost of the differential and preferably reducing same.

SUMMARY OF INVENTION

The invention herein relates to what may be called a positive clutch differential. The differential housing is of the size and shape of a conventional differential. However, within the differential are two self-locking and torque responsive friction clutches, each connected to one of the driven shafts or axles. When the vehicle is driven straight forward, both clutches are locked and torque is distributed substantially equally to both output shafts or axles so that the driven wheels rotate equally. However, when the vehicle moves along a curve or turns, the wheel on the outer side of the curve is disengaged, that is, its clutch unlocks, so that such wheel is free wheeling. Consequently, all power and torque flow to the inner wheel in the turn which inner wheel now transmits all of the torque to the ground. Likewise, should either wheel lose traction, all driving torque will be distributed to the opposite wheel. The performance of this differential is the same in either driving direction, that is, whether the vehicle travels forwardly or reversely.

The differential includes a center driving ring-shaped thrust coupling member that is secured within a conventional differential casing for rotation therewith. Such casings are normally rotated by means of a bevel gear secured to the casing which engages a pinion mounted upon the engine propeller or output shaft. The center driving ring is located between a pair of pressure rings, each of which is movable towards and away from the adjacent face of the center ring.

Each of the opposite faces of the center driving ring is provided with wedge-shaped cam-like teeth. These teeth couple with corresponding teeth formed on the adjacent faces of the pressure rings.

Each of the pressure rings is connected to the inner end of one of the axles or shafts which extends into the casing. This connection is through a friction clutch which locks or engages when the respective pressure ring moves outwardly, i.e., away from the center driving ring, and disengage or unlock when the pressure rings move inwardly towards the driving ring.

When the vehicle wheels are rotating at the same speed, as when the vehicle is moving on a straight path, the center ring rotates with the differential casing due to the power received from the engine. The center ring teeth engage and wedge outwardly the corresponding teeth of the two pressure rings. Because of the axially outward wedging force upon the pressure rings, these in turn, press outwardly to positively engage their respective friction clutches. These clutches are connected to the axles so that power is transmitted to the axles.

However, when one of the axles rotates faster than the other, as for example when the vehicle is going around a curve wherein the wheel on the outside of the curve must rotate faster, then the pressure ring of that wheel over-runs or rotates more rapidly than the center ring. Consequently, the pressure ring wedge-like teeth, moving faster than the teeth of the center ring, disengage therefrom. That disengagement results in the pressure ring moving axially inwardly, that is, towards the center driving ring, which results in the disengagement of that pressure ring's clutch. When its clutch disengages, its axle no longer receives power or torque and all of the torque is transmitted to the opposite side. Consequently, while one of the axles is "free wheeling" the other carries all of the torque and transmits it through its wheel to the ground.

Because the pressure ring teeth over-run or speed-up relative to the center ring teeth which they engage, there is a normal tendency for the teeth to re-engage. That is, the teeth disengage on one surface and tend to re-engage on the opposite surfaces. In order to prevent this from happening, that is to maintain a gap between the teeth during the over-run or speed-up condition, a stop ring is provided. The stop ring, which is also called a "balking" ring extends through the middle of the center driving ring and connects the two pressure rings together. Each connection is provided by interengaging splines formed on the surface of the stop ring and within openings in the pressure rings through which the stop ring is inserted. These splines, that is the teeth making up the splines, are relatively loose to provide a predetermined amount of backlash. Such backlash permits the pressure ring to move sufficiently so that its teeth disengage from the corresponding teeth on the center driving ring, but then the spline teeth engage to hold the specific pressure ring against further rotational movement relative to the center driving ring. This results in the gapping or spacing apart of the opposite surfaces of the meshing wedge-like teeth of both the pressure ring and the center ring. That is, the backlash in the splines permit limited movement and then hold each pressure ring against further movement with respect to the center driving ring.

Restated in more detail, the differential of this invention normally transmits torque substantially equally to both of the axles or drive shafts through a thrust coupling, which is made up of the center driving ring and the pair of pressure rings which are coupled together because of their meshed wedge-like teeth. The pressure members each are frictionally clutched to their respective axles or shafts. However, during over-runs or speed-ups of one axle, such as when going around a curve or when a wheel spins due to lack of traction, its pressure ring rotates faster than the center ring so that the trailing faces of the pressure ring teeth move ahead of the leading faces of the center drive ring teeth which they otherwise contact during normal operation. Momentarily, a gap appears between the respective teeth which disengages the thrust mechanism.

Continued advancing movement of the pressure ring is stopped by the spacer ring whose backlash permits a gap to appear between the trailing faces of the pressure ring teeth and the leading faces of the center ring teeth but then prevent the opposite teeth faces from engaging during the over-run. Now that the wedge-shaped teeth are disengaged, that axle and its wheel are "free wheeling" and all torque is transmitted to the opposite axle or shaft and its wheel. The disengagement occurs because the pressure ring, which is no longer being wedged outwardly due to the released teeth contact, moves axially inwardly in release its clutch.

When the over-run axle slows down to the speed of the casing and the center driving ring, its pressure ring teeth again re-engage the teeth of the center driving ring and normal power transmission takes place again. This occurs because the re-engaging teeth again wedge or move outwardly the pressure ring teeth so that the pressure ring clutch re-engages.

The differential of this invention is formed of essentially five elements which are of relatively simple and inexpensive construction. These elements are: First, a conventional appearing, that is, conventional size and shape, casing or housing which is rotated in the conventional manner through the usual gearing from the engine drive shaft or propeller shaft. Second, a flat disk-like or ring-shaped center driving ring which rotates with and is fastened within the interior of the casing. Third, a pair of pressure rings located on opposite sides of the center ring. Fourth, a stop ring which extends through the axially aligned pressure rings and center driving ring, interconnecting with the pressure rings through the loosely meshed corresponding splines. Fifth, a coil spring is arranged around the stop ring and between the pressure rings, extending through a central opening in the center driving ring, to exert a slight amount of axially, outwardly directed pressure upon the pressure rings. The springs provide for virtually instantanenous engagement of the clutches when driving power is applied.

These five elements, particularly the rings, are extremely simple in construction and simple and inexpensive to construct. For example, their wedge-like teeth may be made through the use of forging processes with minimal machining required. Moreover, the clutch engagement and disengagement requires movement of a small amount, such as within a few thousandths of an inch and the movement is virtually instantanenous whereby there is practically no wear upon the clutches during engagement or disengagement so that the differential is expected to wear far better and longer than currently available differentials.

Among the objects of this invention is to provide an automotive type differential with improved traction under slipping conditions, and eliminating the spinning of either wheel when it looses traction and which provides a higher efficiency and safer operation. This type of differential is particularly useful in four-wheel drive vehicles and off the road vehicles. Nevertheless, despite its substantially improved operation, its construction is so simplified as to be less costly to produce than other locking type differentials.

Another object of this invention is to provide a differential which is quiet under all driving conditions or when the power is shifted from one to another of the driven axles due to slippery conditions or driving about curves or turns. Further, the differential construction eliminates the negative torques which are induced in the unit and the so-called "stick-slip" conditions which are common in currently available limited slip type of differentials.

These and other objects and advantages will become apparent upon reading the following description, of which the attached drawings form a part.

DETAILED DESCRIPTION

Figure 1:
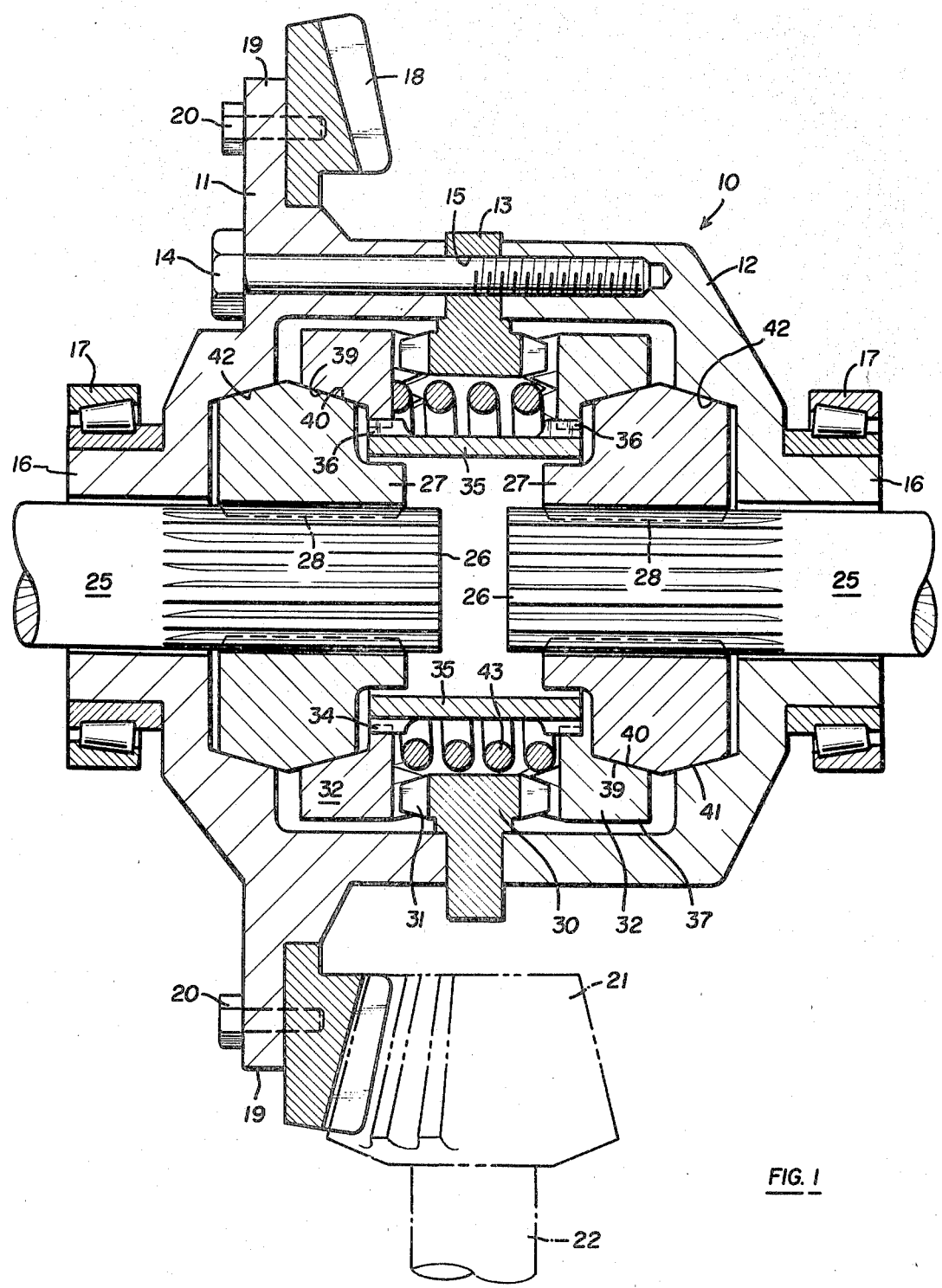
FIG. 1 is a cross-sectional view schematically illustrating the differential herein.

FIG. 1 illustrates an embodiment of the differential of this invention which utilizes a cone type clutch. This differential includes a rotatable outer casing or housing 10. The casing is made of a flanged part 11 and an opposite part 12, between which is positioned a flat ring-like member 13. The two casing parts are fastened together by bolts 14 which pass through aligned openings in each of the parts and also through openings 15 in the flat ring.

drive ring. As a result, the right hand axle is now free wheeling, i.e., not powered. However, the left-hand axle remains powered, with the left-hand pressure ring having its teeth still in contact with the wedge-shaped teeth of the center drive ring and operating normally.

As can be seen, the interengaging, but loosely meshed teeth of the stop ring and the pressure ring splines, work together to form a stop. In one situation, that stop permits the wedge teeth of the center ring to engage the pressure ring teeth. In another situation, that is, when one axle over-runs the speed of the casing, that stop allows the wedge-shaped teeth to disengage and holds them disengaged.

During the time that the wedge-shaped teeth are engaged, the wedging action forces the respective pressure rings outwardly. However, when they are not interengaged, there is an inherent tendency for the pressure rings to move inwardly. In order to provide for instantaneous response of the clutch engagement, the coil sping 43 is relied upon to provide a slight amount of spring pressure which normally urges the two pressure rings apart and axially outwardly into clutch engagement positions.

The relative proportions required of the differential's elements in order to make the cone type differentials' clutches self-locking may be expressed in the following mathematical relationship:

$$\text{Tan } B = \tan A r / 4 RU$$

Where:
B = Thrust angle, cam angle
r = Mean radius, thrust coupling
R = Mean radius clutch facings
U = Friction coefficient
A = Cone angle The thrust angle B refers to the angle of the surface of a wedge-shaped tooth relative to the altitude or line which bisects the triangle formed by the opposed faces of adjacent teeth. That is, it is the angle between the hypotenuse (tooth surface) and altitude of the equilateral triangle formed by adjacent wedge-shaped tooth surfaces.

Figure 7:
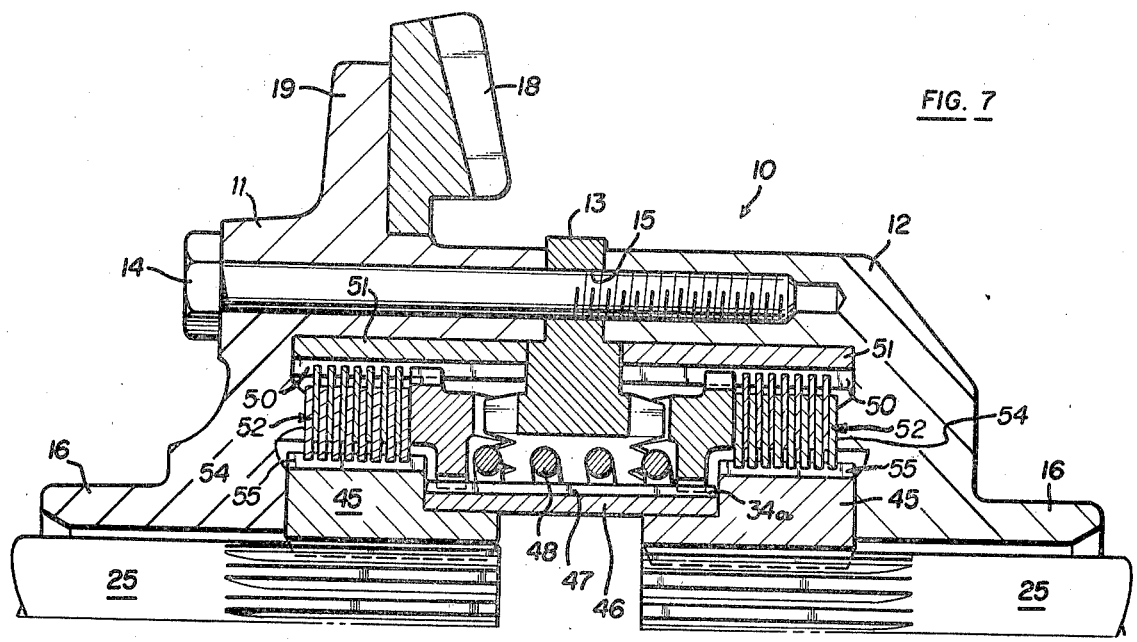
FIG. 7 is a partial cross-sectional, schematic view of a modified differential having a disk type clutch.
Figure 8:
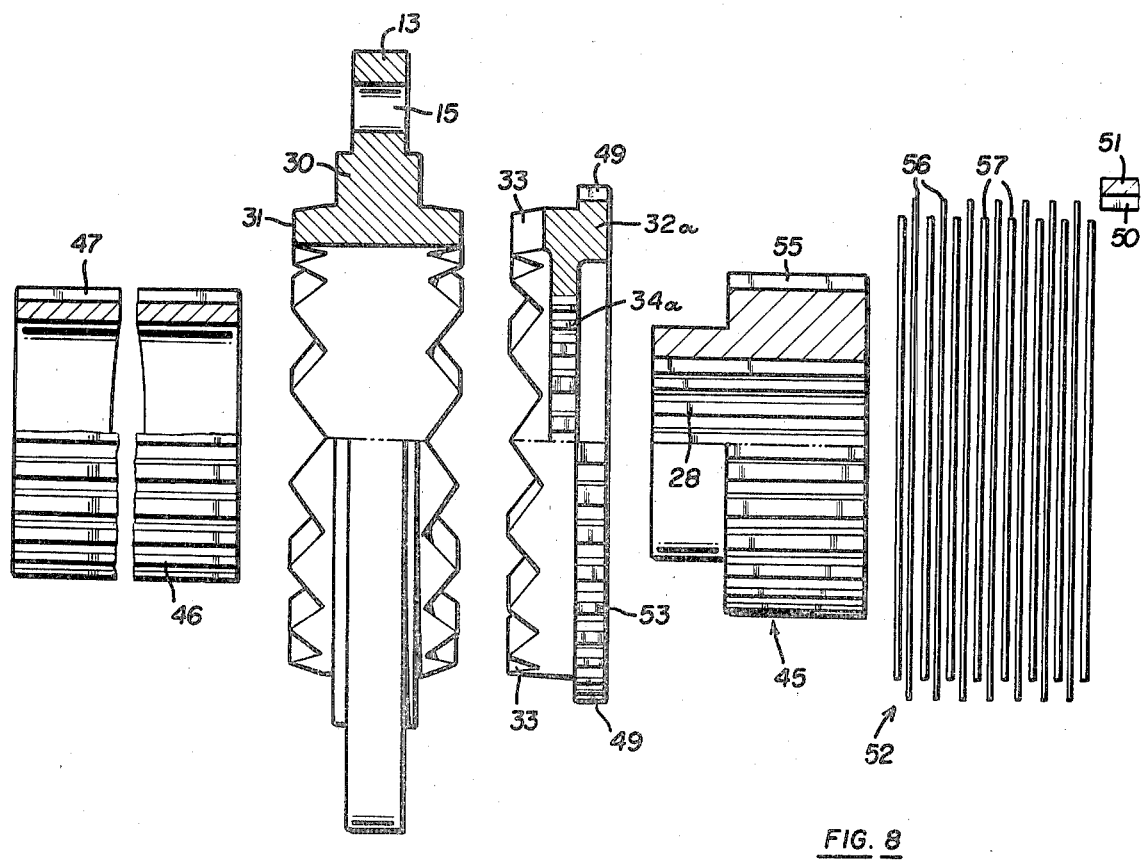
FIG. 8 is a fragmentary cross-sectional view of certain of the parts which make up the disk clutch type differential of FIG. 7.

Although the clutches are illustrated as being of the conical type, disk type clutches may also be used, depending upon the requirements of the differential. Thus, FIGS. 7 and 8 illustrate a modification which is similar in operation and construction to that shown in FIGS. 1 through 6, but utilize disk type clutches instead of conical clutches. FIG. 7 illustrates the differential which includes the casing 10 made of opposing parts 11 and 12 similar to the casing shown in FIG. 1. Opposed axles or shafts 25 are inserted within the casing in the same manner as described above, and each axle includes an axle hub 27 having internal splines which mesh with splines formed on the inner ends of the shafts 25.

The inner or facing ends of the axle hubs 45 are reduced in diameter and are surrounded by the stop ring 46 which has an external spline tooth arrangement 47. The coil spring 48 surrounds the splined stop ring and fits within the open center of the center driving ring 30 which is similar to the center driving ring described in connection with FIG. 1.

The pressure rings 32a have wedge-shaped teeth 33 which mesh with the correspondingly shaped wedge-shaped teeth 31 on the center driving ring 30 as above.

Figure 3:
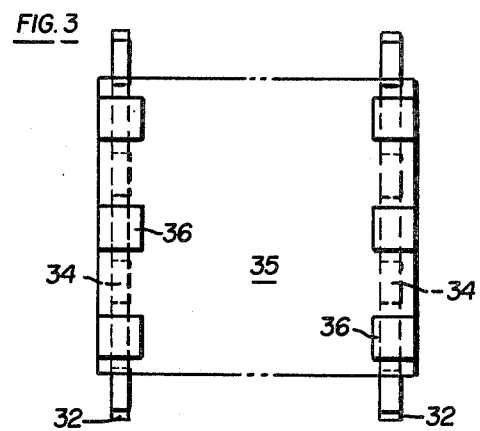
FIG. 3 is a diagramatic view of the stop ring and the two pressure rings showing the relative positioning of their respective meshed teeth during normal power drive conditions as illustrated in FIG. 2.
Figure 5:
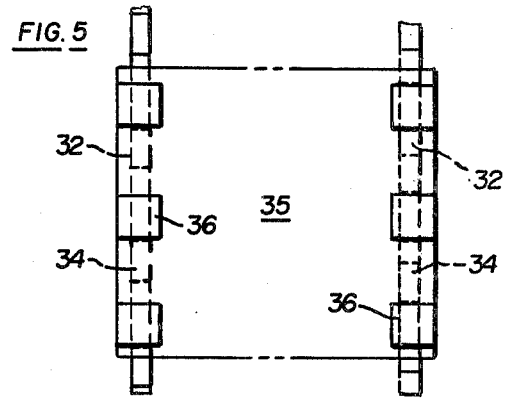
FIG. 5 is a diagramatic view, similar to FIG. 3, showing the relative positioning of the meshed teeth of the stop ring and the two pressure rings during the condition shown in FIG. 4.
Figure 6:
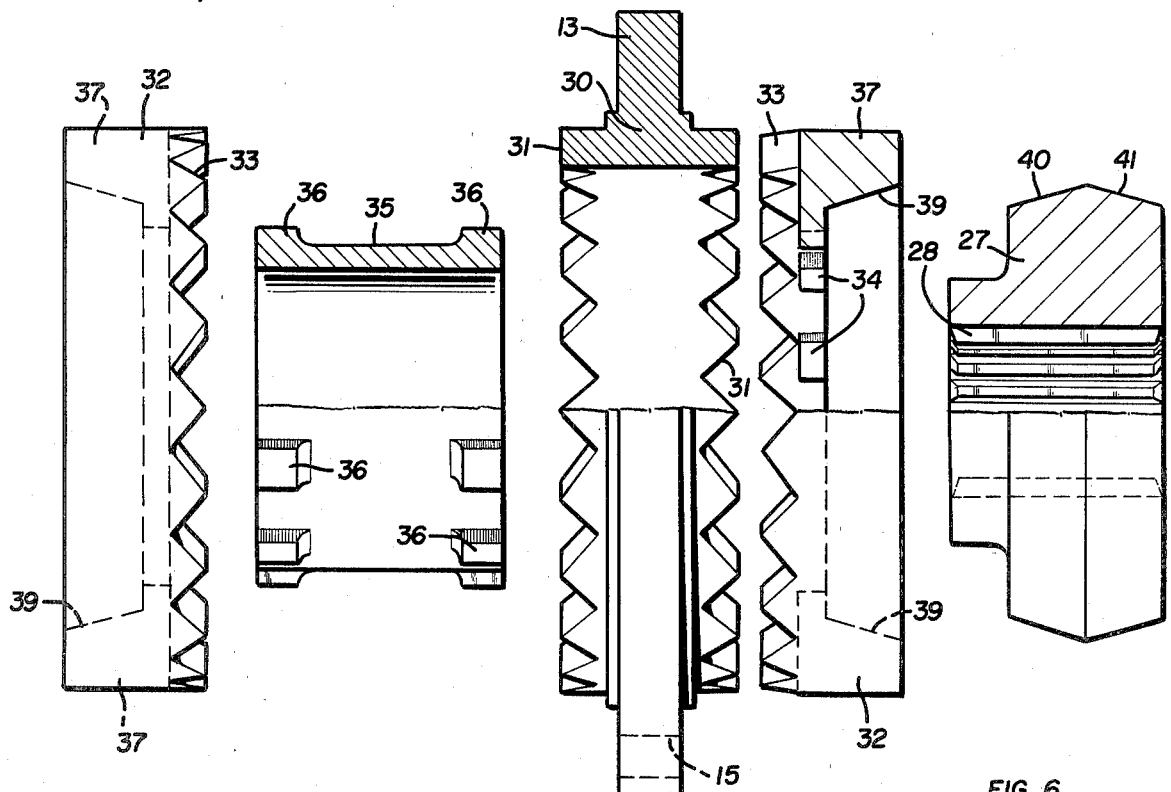
FIG. 6 is a partial cross-sectional, disassembled view of a number of the parts which make up the differential.

The pressure ring 32 includes an internal splined tooth configuration 34 which meshes with the stop ring spline teeth 47 in the same manner as that set forth above in connection with FIGS. 3 and 5 in the embodiment of FIG. 1. However, a second spline or tooth configuration 49 is formed on the exterior of the pressure rings. These teeth 49 mesh with internal splines 50 formed on clutch rings 51 which surround the pressure rings.

A plurality of flat clutch plates 52 surround each hub 45 and are engaged between the pressure ring outer plate engaging face 53 and an anvil or rib annular formation 54 formed within the casing (see FIG. 7).

Figure 2:
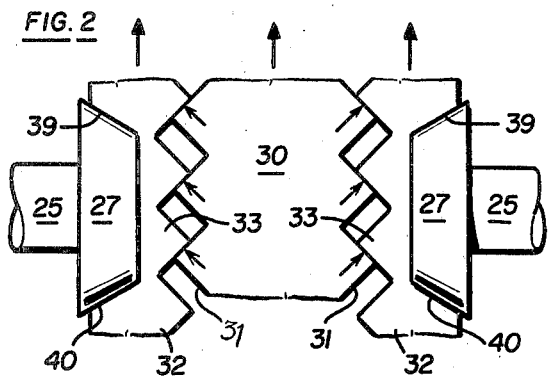
FIG. 2 is a diagramatic view of the differential center driving ring and the two pressure rings during normal power drive conditions, that is, with both axles driven at the same speed.

The clutch plates 52 alternate between plates that have outer notches which receive the teeth of the spline 50 of the outer clutch ring 51 and reduced diameter plates which have inner notches that receive spline teeth 55 of the hub 45. Thus the clutch plates 52 alternate between larger diameter plates 56 and smaller diameter plates 57 which are squeezed together by the pressure of the face 53 of the pressure ring directed towards the annual anvil 54. This pressure occurs when the pressure ring teeth 53 are engaged with and are driven by the wedge-shaped teeth 31 of the center driving ring as illustrated in FIG. 2.

Figure 4:
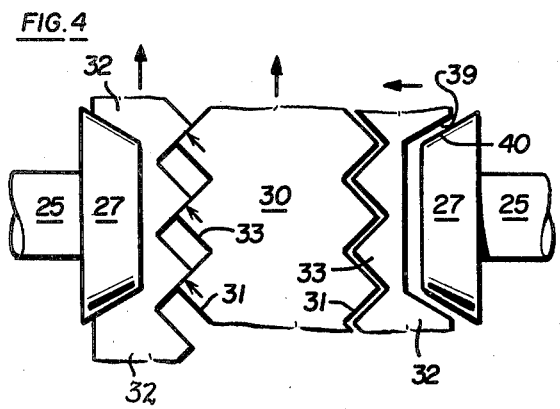
FIG. 4 is a diagramatic view, similar to FIG. 2, but illustrating the right side pressure ring disengaged from the center driving ring and with its clutch disengaged for free-wheeling of the right-hand anxle.

When an axle over-runs, its pressure plate moves into the gapped apart position illustrated in FIG. 4, i.e., where the wedge-shaped teeth disengage and the flat pressure or clutch surface 53 moves axially inwardly towards the center driving ring so as to release the pressure on the clutch plates and thereby open the clutch.

The inner spline 34a of the pressure ring 32a is engaged with and axially slides relative to the spline 47 of the stop ring 46 to provide for the stopping and spacing action which is illustrated in FIG. 5.

As in the case of the cone type of clutch, a small amount of movement in the axial direction of the pressure ring, such as in the range of a few thousandths of an inch is sufficient to engage or disengage the clutch for tthat particular axle. Thus, there is minimal wear on the clutch faces and clutching and de-clutching is virtually instantaneous. In the disk type clutch, as well as in the cone type clutch, the clutch faces engage when the parts are at the same speed which substantially eliminates wear due to engagement or disengagement.

The relative proportions required of the elements of the disk type differential in FIGS. 7 and 8 to make the differentials' clutches self-locking is slightly different than the proportions expressed in the mathematical relationship given above in connection with the cone type clutch. This relationship is as follows:

$$\text{Tan } B = r / RNU$$

Where:
B = Thrust angle, cam angle
r = Means radius, thrust coupling
R = Means radius clutch facings
N = Number of friction surfaces
U = Friction coefficient The construction of the differential described herein, whether of the cone clutch type or the plate clutch type, is not complex and the parts are produceable by relatively inexpensive manufacturing processes. Consequently, the construction is economical to produce and in more efficient, more wear resistant and substantially better in operation than prior comparable differentials.

Having fully described an operative embodiment of this invention, I now claim:

The openings in the opposite part 12 are threaded so that the bolts may mechanically secure the two parts together into the hollow casing shape.

Each of the casing parts is provided with a sleeve-like bearing end 16 around which a bearing 17 is mounted. The bearings 17, in turn, are secured within the differential outer structure of outer housing which is stationary so that the casing 10 may rotate within it about the bearings 17. The stationary housing is omitted from this disclosure since it is conventional. For illustration purposes, the construction shown in my above-mentioned U.S. Pat. No. 2,720,796 includes such a support.

A conventional bevel gear 18 is fastened to the flange 19 which is formed integral with the flanged part 11 of the casing. Suitable bolts 20 are used to fasten the bevel gear to the flange. The bevel gear meshes with a drive pinion 21 secured on the end of the power drive shaft 22 which may be the propeller shaft or engine drive shaft, as is conventional.

A pair of axles or shafts 25 extend into the casing through the bearing ends 16. The inner ends of the axles are provided with splines 26. Axle hubs or axle rings 27 having spline teeth 28 fit over and mesh with the splined inner ends 26 of the axles so that the hubs may slide axially of the axles.

The center drive ring or thrust member 30 is integral with the flat ring 13 that separates the two casing parts. Thus, the center drive ring rotates with the casing as if it were part of the casing. The opposite faces of the center drive rings are provided with wedge-shaped teeth 31, which are V-shaped in cross section.

The center drive ring is located between a pair of pressure rings 32, each of which has wedge-shaped teeth 33 for meshing with or coupling with the teeth 31 of the center drive ring.

Each of the pressure rings is also provided with an internal spline 34.

The stop ring or so-called "balking" ring 35 is located within the casing, co-axially with and extending through the centers of the pressure rings and the center driving ring. Spline teeth 36 formed upon the stop ring, particularly at its opposite edges, loosely mesh with the teeth of spline 34 of the pressure rings 32. The spline teeth 36 of the stop ring may be formed as a pair of spaced apart gear-like formations or alternatively as a unitary tooth formation extending completely across the surface of the ring.

The rims 37 of the pressure rings 32 are widened considerably and each is provided with an internal conical clutch face 39 which engages an external conical clutch face 40 on its adjacent axle clutch hub 27. Each hub is also formed with an outer conical portion 41 which fits within a conical seat 42 formed within the casing parts 11 and 12 (see FIG. 1).

A coil spring 43 encircles the stop ring and its opposite ends abut against the opposed pressure rings. The coil spring provides a small amount of axially outwardly directed pressure upon the pressure rings so that they normally tend to virtually instantaneously move outwardly for clutch engagement.

The operation of the differential is diagramatically illustrated in FIGS. 2 through 5. Thus, referring to FIG. 2, the center driving ring 30 is rotatably driven by the rotating casing, as illustrated by the large arrow. As the center drive ring 30 rotates, its wedge-shaped teeth 31 engage and wedge against the adjacent wedge-like teeth 33 of each of the adjacent pressure rings 32. The wedging force is illustrated by the small arrows drawn at the engaging teeth. Thus, the rotational movement of the center drive gear results in the pressure rings likewise rotating. The pressure conical clutch surfaces or clutch faces 38 engage for corresponding conical clutch faces 40 on the double cone clutch hubs 27. Therefore, the hubs rotate with the pressure rings and because they are spline connected with the axles, the axles rotate at the same speed, which would correspond to the vehicle moving along a straight path.

The amount of movement axially outward by the pressure rings, due to the wedging action of the engaging wedge-like teeth, may be on the order of 20-30 thousandths of an inch. The lesser amount of movement, the shorter the time of engagement. Ordinarily, the engagement time is very small so that there is virtually instantaneous engagement for all practical purposes which substantially increases the time that both driven axles share the torque output to the differential.

During the driving conditions shown in FIG. 2, the stop ring or balking ring 35 has its spline teeth 36 centered relative to the teeth of the spline 34 of the pressure rings. The meshed teeth of the spline 34 and the stop ring spline are loosely interfitted so that there is sufficient backlash is permit the teeth to be centered, as illustrated in diagramatically exaggerated form in FIG. 3.

Next, turning to FIG. 4, the right hand pressure ring 32 is shown as disengaged from its clutch connection with the axle hub. A condition like this comes about when the vehicle makes a left turn or travels about a left directional curve so that the right-hand wheel must rotate at a faster speed than the left-hand wheel. During the time of that faster speed, the shaft of the right-hand wheel rotates at a greater speed than the center driving ring 30 and the differential casing 10.

When the shaft rotates faster than the driving ring, because of the clutch connection between the axle hub 27 and the adjacent pressure ring, that pressure ring tends to over-run or go faster than the center drive ring. This results in the meshing teeth separating (see FIG. 4) because the pressure ring teeth advance more rapidly than the wedge-shaped teeth of the center driving ring. Thus, the trailing surface of the teeth of the pressure ring advance away from the lead teeth surfaces of the center driving ring teeth. That advancement could very well result in the teeth continuing until they again engage on their opposite surfaces. That is, continued movement could result in the lead surfaces of the pressure ring teeth engaging the trailing surfaces of the center ring teeth.

However, to prevent the now momentarily separated wedge-shaped teeth from re-engaging on their opposite faces, the stop ring 35 is now located so that its teeth engage the surfaces of the teeth of the two pressure rings. As can be seen in FIG. 5, the trailing surfaces of the teeth on the right-hand pressure ring engage the leading surfaces of the spline teeth of the stop ring. The converse occurs on the left-hand teeth. That is, the backlash is over come and the teeth engage so that they form a stop and thereby maintain the wedge-shaped teeth in the condition shown in FIG. 4.

Because the wedge-shaped teeth shown in FIG. 4 are not engaging on the right-hand side, the right-hand pressure ring tends to move inwardly axially, that is to the left, and center itself in an unloaded position. Consequently, the interengaging clutch surfaces separate. Now, the axle hub is disengaged from the pressure ring so that it is free to turn independently of the center 1. In a differential assembly for rotatably driving a pair of axially aligned axle-like shafts and having a housing within which adjacent end portions of the two shafts extend, with said housing being rotatable about an axis aligned with the axes of said shafts, an improved means arranged within the housing for releasably interconnecting the shaft ends to the housing for thereby rotating the shafts, comprising:

a center driving ring axially aligned with and connected to the housing for rotation therewith;

a pair of annular pressure rings, each axially aligned with said arranged adjacent one end of the center driving ring, with the pressure rings each being axially movable a short distance towards and away from the center driving ring, said pressure rings and center driving ring having adjacent facing portions;

interengaging, generally v-shaped, wedge-like teeth integrally formed on the adjacent facing portions of the center driving ring and each of the pressure rings, with said adjacent interengaging wedge-like teeth being loosely meshed so that rotation of the center driving ring causes the pressure ring teeth to engage with and wedge axially outwardly of the center driving ring teeth, but with rotation of either of the pressure rings at a speed in excess of the center ring speed, resulting in the pressure ring teeth gapping away from contact with their respective adjacent center driving ring teeth, so that the wedging action is released, wherein the pressure ring may move axially in a direction towards the center driving ring;

a stop ring extending within and being coaxial with the center driving ring and through an axially aligned opening formed in each of the annular pressure rings, said stop ring having gear-like teeth formed upon its opposite outer peripheral edge portions, and meshing with corresponding inner gear-like teeth formed on the periphery edge portion defining the opening formed in each adjacent pressure ring, with said stop ring and inner pressure ring teeth being loosely interfitted for limited relative rotational movement of the stop ring and each pressure ring, before engagement of their respective teeth;

and with the spacing between adjacent inner pressure ring teeth and stop ring teeth being formed so that such adjacent teeth will engage when the center ring wedge-like teeth and adjacent pressure ring wedge-like teeth are gapped apart to thereby roughly center the gapped apart teeth from each other and prevent the opposite tooth surfaces of the gapped apart teeth from engaging each other;

a relasable clutch means for inter-engaging each pressure ring with its respective adjacent axle end when the respective pressure ring is wedged in a direction outwardly of the center pressure ring during engagement of the respective teeth and for releasing the pressure ring from its adjacent axle end when the respective teeth are gapped apart;

a spring extending between and pressing apart the two pressure rings for resiliently urging the pressure rings into engagement with their respective clutch means;

whereby normal rotation of the center driving ring, with the housing, rotates both pressure rings and the axle shafts through the respective clutch means, but during any over-speed of either axle, relative to the housing rotation, the meshing wedge-like teeth of its respective pressure ring gaps relative to the corresponding wedge-like teeth of the center driving ring so that the pressure ring moves axially towards the center driving ring for thereby releasing its clutch connection to its axle so that its axle is free to rotate independently of the housing.

2. A differential assembly, as defined in claim 1 and wherein said clutch means comprises a conical clutch surface formed on each of the pressure rings for frictionally engaging in face to face contact with a mating conical clutch surface formed on an axle ring mounted upon its adjacent axle end for thereby clutch engaging and disengaging the pressure ring and its respective axle end.

3. A differential assembly as defined in claim 1, and where said clutch means for each of the pressure rings comprises a series of interleaved clutch plates alternatively secured to the respective pressure ring and its adjacent clutch hub, with the interleaved clutch plates being relatively axially movable into clutch surface to surface contact and disengagement as their pressure rings move axially in directions away from and towards the center drive ring respectively.

4. A differential assembly as defined in claim 1, and including said spring being formed as a coil surrounding the stop ring and extending through the center driving ring and having its opposite ends each engaging against a pressure plate for normally resiliently pressing the two pressure rings apart, that is, in directions away from the center driving ring for engagement of the adjacent wedge-like teeth formations and the clutch means.

* * * * *